United States Patent
Miura et al.

[11] Patent Number: 5,897,606
[45] Date of Patent: *Apr. 27, 1999

[54] SHOCK VIBRATION STORING METHOD

[75] Inventors: Shinsuke Miura, Mishima; Takeshi Itoi, Kawasaki; Shuichi Yabushita, Yokohama, all of Japan

[73] Assignee: Yamaichi Electronics Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/572,674

[22] Filed: Dec. 14, 1995

[30] Foreign Application Priority Data

Dec. 16, 1994 [JP] Japan .................................... 6-333906

[51] Int. Cl.$^6$ .............................. G06F 17/40; G01P 15/08
[52] U.S. Cl. ................................. 702/56; 702/141; 360/5; 73/609
[58] Field of Search ..................... 364/508, 483, 364/484, 485, 487, 566, 528.15; 360/5; 73/579, 587, 602, 609, 610, 611, 646, 570, 489, 491; 702/56, 141

[56] References Cited

U.S. PATENT DOCUMENTS

| | | | |
|---|---|---|---|
| 4,114,450 | 9/1978 | Shulman et al. | 364/566 |
| 4,484,290 | 11/1984 | Bagnall et al. | 364/483 |
| 4,558,379 | 12/1985 | Hütter et al. | 360/5 |
| 4,589,074 | 5/1986 | Thomas et al. | 364/483 |
| 4,745,564 | 5/1988 | Tennes et al. | 364/566 |
| 4,862,394 | 8/1989 | Thompson et al. | 360/5 |
| 4,901,009 | 2/1990 | Schultze et al. | 364/487 |
| 5,056,056 | 10/1991 | Gustin | 360/5 |
| 5,140,436 | 8/1992 | Blessinger | 360/5 |
| 5,153,501 | 10/1992 | Shimada et al. | 364/487 |
| 5,216,621 | 6/1993 | Dickens | 364/483 |

FOREIGN PATENT DOCUMENTS 2-8272  5/1985  Japan .

OTHER PUBLICATIONS

"Installation and Maintenance Manual Model A700 Accelocorder", Teledyne Geotech, Oct. 1984.
"The A–700 Accelocorder", Teledyne Geotech, no date.

*Primary Examiner*—Eric W. Stamber
*Attorney, Agent, or Firm*—Wenderoth, Lind & Ponack, L.L.P.

[57] ABSTRACT

In a method for storing vibration waveform data sequentially detected by a vibration sensor. The vibration storing method includes detection of a reference level terminal point ($P_3$) between a preestablished reference level and a vibration waveform. The detected reference level terminal point serves as a trigger. Also, vibration waveform data from a predetermined point ($P_0$) before a reference level starting point ($P_1$) to a predetermined point ($P_4$) after the reference level terminal point ($P_3$) are stored in a memory. A first preliminary memory and a second preliminary memory are utilized so that the vibration waveform data from those two memories are alternately transferred and stored.

10 Claims, 4 Drawing Sheets

PROGRESSIVE TYPE RESERVE MEMORY 1, 2, 3 ······ n+1, n+2, n+3 = DIGITAL DATA

SHOCK VIBRATION STORING METHOD

BACKGROUND OF THE INVENTION

1. Field of the Invention

The present invention relates to a shock vibration data storing method in which required vibration waveform data generated during transportation, for example, are efficiently gathered and stored.

2. Brief Description of the Prior Art

A typical conventional shock vibration data storing apparatus, as discussed, for example, in Japanese Patent Publication No. Hei 2-8272, is constituted such that when vibration waveform data have reached a pre-established reference level (when reference level starting points of the waveform and reference level have been detected), this serves as a trigger for storing future vibration waveform data from the reference level starting point to a predetermined point of the vibration waveform in a memory within a range of the capacity of the cyclic memory, and supplementarily storing vibration data before the reference level starting point within the limit of the remaining capacity of the cyclic memory. Also, vibration waveform data including a peak point exceeding the reference level are stored in the memory. Those arrangements are made for the purposes of grasping the transportation status.

The basic idea prevailing in any one of the conventional techniques is that data which have exceeded the reference level, among all vibration waveform data, are to be gathered.

However, as a result of repeated observation and analysis of a large number of transportation examples under various transportation conditions, the inventors of the present invention have found out that it is indispensable for factor analysis of vibration data equal to or more than the reference level including the peak point, and improvement of transportation conditions to grasp the vibration status of not only the vibration including the hazardous peak point but also as to how this vibration is induced, how the induced vibration is terminated and what peak point is reached after the preceding peak point has been terminated.

In the above-mentioned Japanese Patent Publication No. Hei 2-8272, since it is only a predetermined number of words after the reference level starting point of the reference level that can be stored in a memory, it is practically impossible to ensure that the peak point is included in this predetermined number of words. This being the case, it is more difficult to make sure that the vibration waveform data, before the reference level starting point and after the reference level terminating point, contribute to the grasp of factors of waveform data which have exceeded the reference level.

An object of the present invention is to solve the above problems.

SUMMARY OF THE INVENTION:

According to a first aspect of the present invention, there is provided in a method for storing vibration waveform data sequentially detected by a vibration sensor, a shock vibration storing method being characterized in that by serving detection of a reference level terminal point ($P_3$) between a preestablished reference level and a vibration waveform as a trigger, vibration waveform data from a predetermined point ($P_0$) before the reference level starting point ($P_1$) to a predetermined point ($P_4$) after the reference level terminal point ($P_3$) are stored in a memory.

According to a second aspect of the present invention, there is provided in a method for storing vibration waveform data sequentially detected by a vibration sensor, a shock vibration storing method being characterized in that a constant quantity of vibration waveform data are gradually stored in a first preliminary memory with the progress of generation of the vibration waveform data, selected data among the vibration waveform data stored in the first preliminary memory are transferred to a main memory for storage therein, a constant quantity of waveform data subsequent to that stored in the first preliminary memory are gradually stored in a second preliminary memory during the time the selected data are transferred to the main memory for storage therein, and selected data among the vibration waveform data stored in the second preliminary memory after the transfer are transferred to the main memory for storage.

According to a third aspect of the present invention, there is provided in a method for storing vibration waveform data sequentially detected by a vibration sensor, a shock vibration storing method being characterized in that a constant quantity of vibration waveform data are gradually stored in a progressive type preliminary memory with the progress of generation of the vibration waveform data, and selected data among the vibration waveform data stored in the preliminary memory are progressively transferred to a main memory for storage therein.

The above and other objects, features and effects of the present invention will become apparent from the following description with reference to the accompanying drawings.

DETAILED DESCRIPTION OF THE EMBODIMENT:

First Embodiment (FIGS. 1, 2, 3 and 4)

This embodiment includes in a method for storing vibration waveform data sequentially detected by a vibration sensor, a shock vibration storing method, as an idea, in which by serving detection of a reference level terminal point ($P_3$) between a preestablished reference level T and a vibration waveform as a trigger, vibration waveform data from a predetermined point ($P_0$) before the reference level starting point ($P_1$) to a predetermined point ($P_4$) after the reference level terminal point ($P_3$) are stored in a main memory 4.

Figure 1:
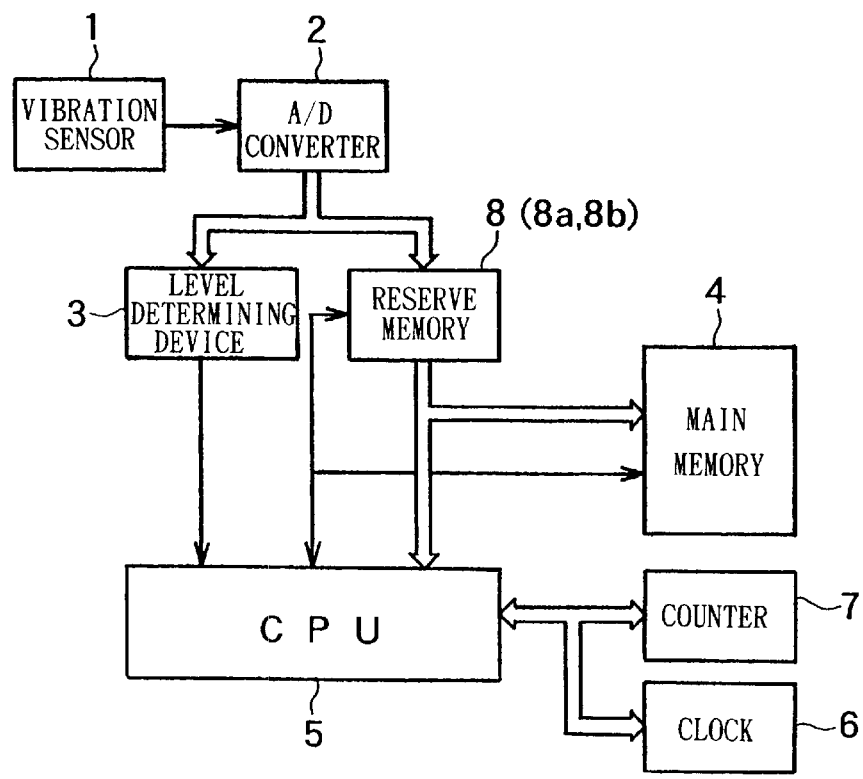
FIG. 1 is a block diagram showing a shock vibration data storing method according to a first embodiment of the present invention.

As shown in FIG. 1, vibration waveform data (analog signal) sequentially detected by a vibration sensor 1 such as an acceleration sensor are converted into a digital signal by an A/D converter 2 so that selected data as later described will be gradually stored in a main memory 4.

Determination as to whether or not the digital signal (vibration waveform data) has exceeded a reference level is made by a level determining device 3.

Figure 2:
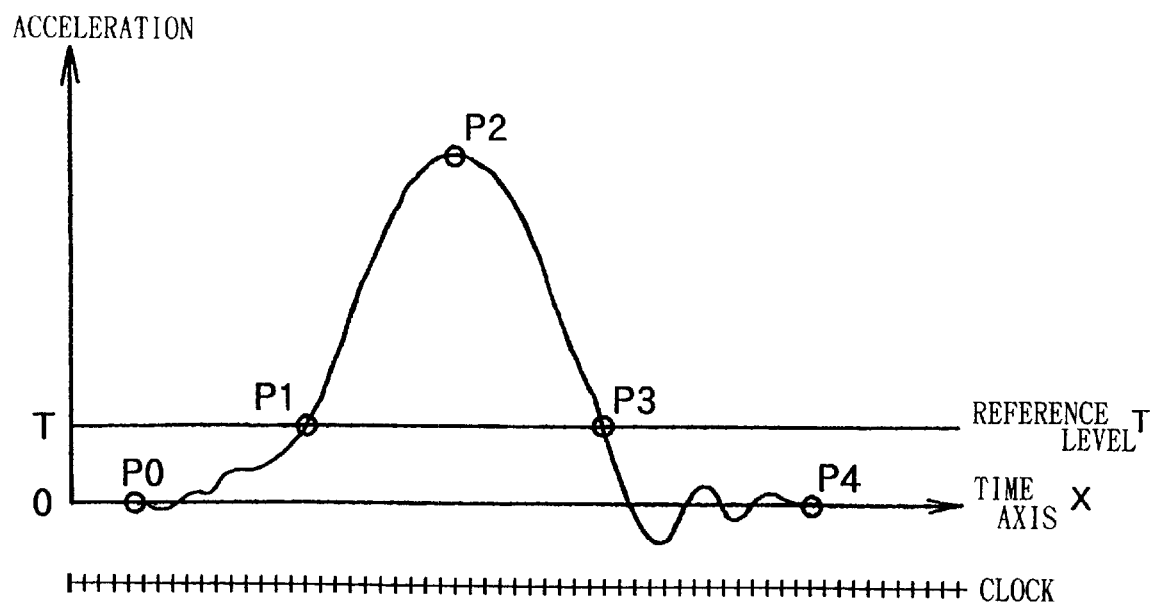
FIG. 2 is a graph showing a waveform exemplifying a unit vibration waveform datum taken in by the first to third embodiments of the present invention.

A CPU 5 recognizes the reference level T. the waveform reference level starting point ($P_1$), the subsequent peak point ($P_2$) and the reference level terminal point ($P_3$) shown in FIG. 2 among the vibration waveform data. When the waveform reaches the point $P_3$, the CPU 5 commands that by this serving as a trigger, vibration waveform data from the predetermined point ($P_0$) before the reference level starting point ($P_1$) to the predetermined point ($P_4$) of the waveform after the reference level terminal point ($P_3$) are taken in for storage in the memory. As a result, the vibration waveform data from $P_0$ to $P_4$ via $P_1$, $P_2$ and $P_3$ are stored in the memory as a whole.

The points $P_0$ to $P_4$ are points on a time axis X, and the reference level T establishes points $P_1$ and $P_3$ in the amplitude of the vibration waveform data.

The vibration waveform data are sampled at equal intervals by a clock 6 and a counter 7. The sampling values thus obtained serve as the vibration waveform data. A preliminary memory 8 is employed as a preceding stage memory. This preliminary memory 8 has the function of gradually storing a constant quantity of data in accordance with the generation of the vibration waveform data which have been sequentially detected by the vibration sensor 1 and subjected to the A/D conversion.

When the level determining device 3 judges that the vibration waveform data output from the vibration sensor 1 are data which have exceeded the reference level T, the CPU 5 specifies the reference level starting point ($P_1$) between the reference level T and the vibration waveform, the peak point ($P_2$) and the reference level terminating point ($P_3$). Then, when the waveform reaches the reference level terminating point ($P_3$), by this serving as a trigger, the CPU 5 takes out the waveform data from the point $P_0$ before the point $P_1$ to the point $P_4$ after the point $P_3$ from the preliminary memory 8 and stores them in the main memory 4.

By repeating the above procedures, the data after the point $P_0$ and before the point $P_1$ and the waveform data up to the point $P_4$ after the point $P_3$ among all the vibration waveform data detected by the vibration sensor 1 are detected and gradually stored in the main memory 4 together with the vibration waveform data up to $P_1$–$P_2$–$P_3$ including the peak point ($P_2$) which exceeds the reference level. The data thus stored are taken out of the memory so as to be subjected to analysis at a later date. The reference level terminating point ($P_3$) where the waveform exceeding the reference level T crosses the reference level has duly passed the peak point ($P_2$). By serving the detection of this reference level terminating point ($P_3$) as a trigger, the vibration waveform data are gathered. By doing this, the data from the reference level starting point ($P_1$) to the peak point ($P_2$) and the future data after the reference level terminating point ($P_3$) are obtained, and the past data before the reference level starting point ($P_1$) are grasped.

According to the teaching of the present invention, by analyzing not only the waveform data ($P_1$–$P_2$–$P_3$) which exceeds the reference level, but also the past data ($P_0$–$P_1$) and the future data ($P_3$–$P_4$), the vibration factors can correctly be obtained.

There are two different methods for gradually storing the constant quantity of data in the preliminary memory 8 with the progress of the generation of the vibration waveform data.

Figure 3:
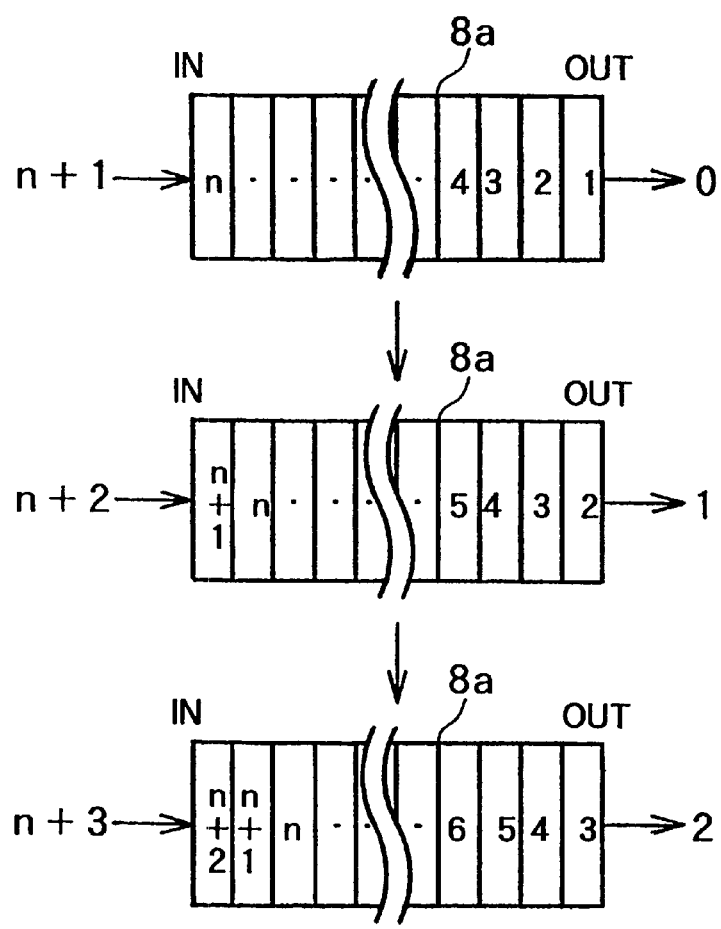
FIG. 3 is a block diagram for explaining a progressive type preliminary memory.

The first is a progressive method. The preliminary memory 8a of this progressive method has a single inlet port and a single outlet port as shown in FIG. 3. The memory is arranged such that when data are input into the inlet port, the data previously input into the inlet port are progressively transferred and moved respectively to the next address and the data at the outlet port are outlet from the preliminary memory 8a so as to be stored in the main memory 4.

The preliminary memory 8a of the progressive method can transfer the consecutive vibration waveform data gradually into the main memory 4 for storage without being limited by the capacity of the preliminary memory.

Figure 4:
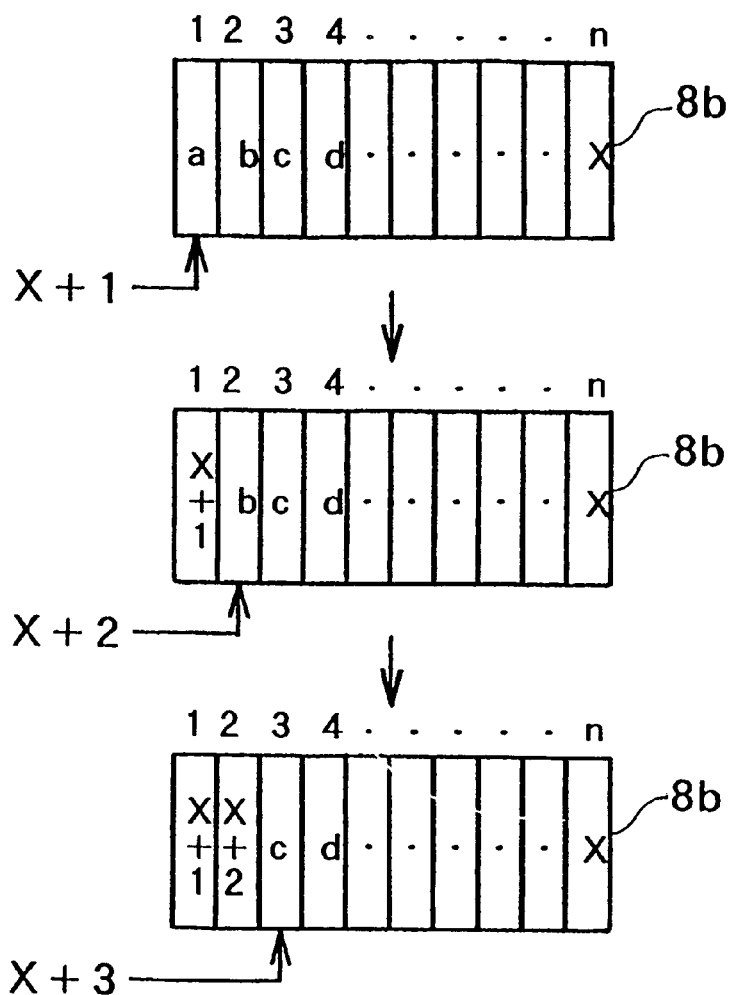
FIG. 4 is a block diagram for explaining a cyclic type preliminary memory.

Another storing method of the preliminary memory 8 is a cyclic method. As shown in FIG. 4, this cyclic method is of the type in which each datum (each waveform datum) is gradually inserted into each address (no progressive insertion of datum is made between addresses) in accordance with the progress of generation of the vibration waveform data so that each address is filled with the datum. After all of the addresses of the preliminary memory 8b are filled, the oldest datum is erased and the next datum is inserted into that address. That is, selected data among data in all addresses are output from the respective addresses as one group and stored in the main memory 4.

Although the cyclic type preliminary memory 8b can transfer all or a part of data to the main memory 4 for storage at a time as mentioned above, it cannot transfer sequential waveform data exceeding the capacity of the preliminary memory.

The first embodiment includes, as the preliminary memory 8, either the embodiment using the progressive type preliminary memory 8a or the embodiment using the cyclic type preliminary memory 8b.

Figure 5:
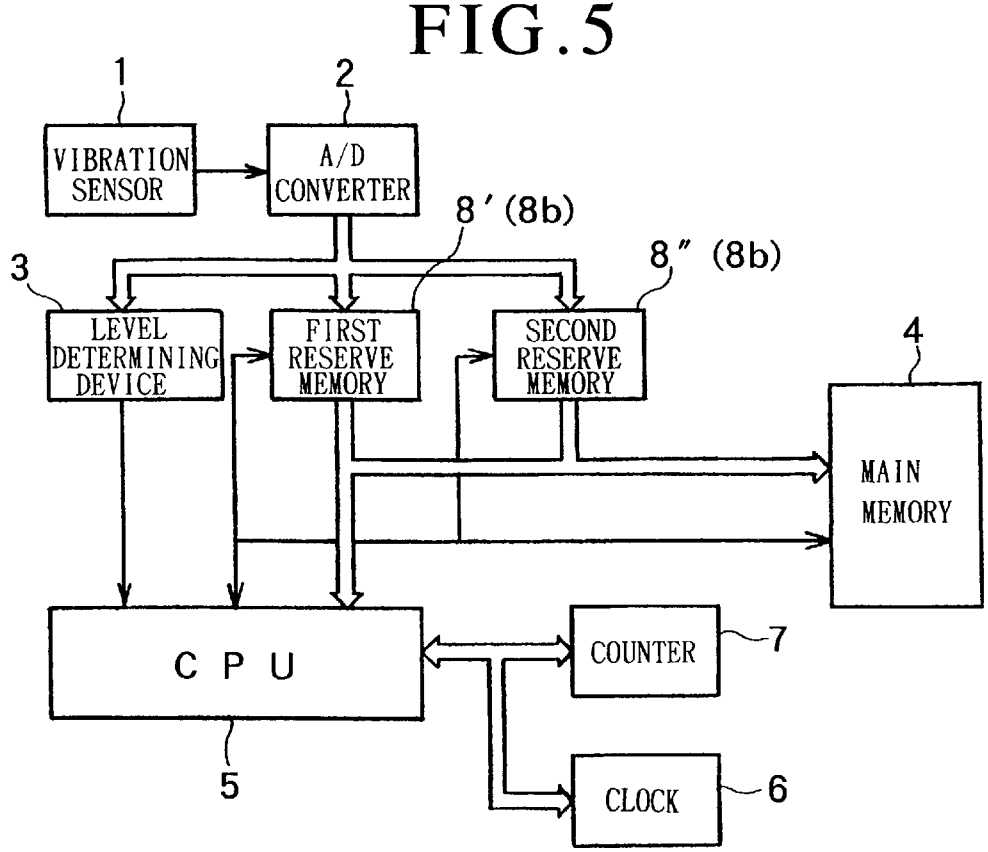
FIG. 5 is a block diagram showing a shock vibration storing method according to a second embodiment of the present invention.
Figure 6:
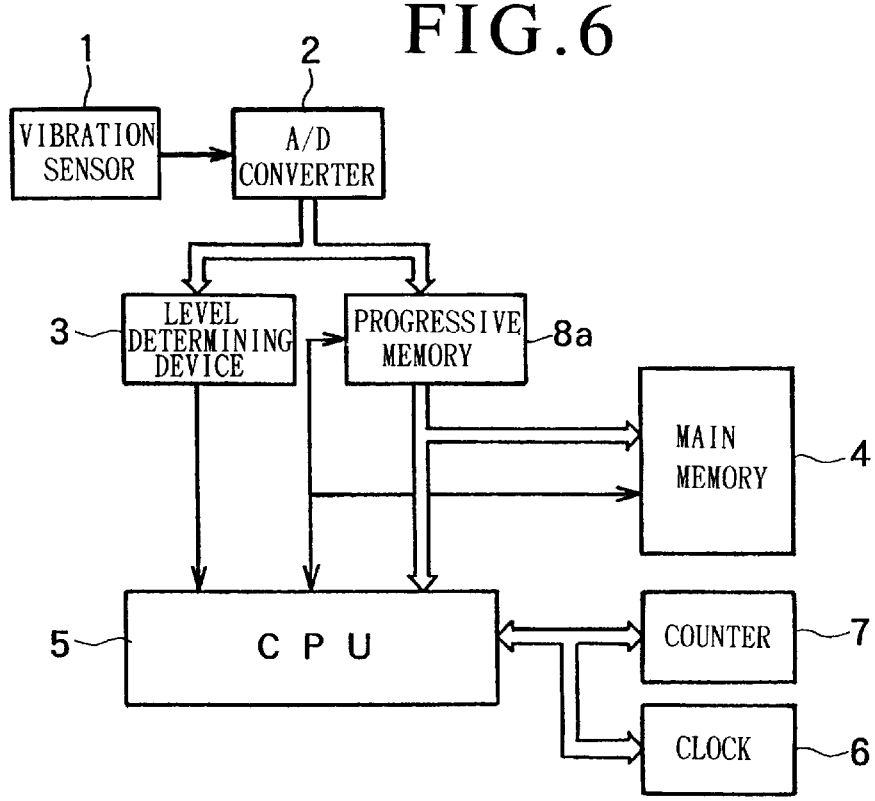
FIG. 6 is a block diagram showing a shock vibration storing method according to a third embodiment of the present invention.

Second Embodiment (FIGS. 4 and 5)

The second embodiment includes a method for storing vibration waveform data sequentially detected by a vibration sensor 1, a shock vibration storing method, in which a constant quantity of vibration waveform data are gradually stored in a first preliminary or reserve memory 8' with the progress of generation of the vibration waveform data, selected data among the vibration waveform data which are stored in the first preliminary memory 8' are transferred to a main memory 4 for storage therein. A constant quantity of waveform data subsequent to that stored in the first preliminary memory 8' are gradually stored in a second preliminary memory 8" during the time the selected data are transferred to the main memory 4 for storage therein. Also selected data among the vibration waveform data stored in the second preliminary memory 8" after the transfer are transferred to the main memory 4 for storage.

More specifically, as a preceding stage memory of the main memory 4, a first preliminary memory 8' and a second preliminary memory 8" are employed. Both the first and second preliminary memories 8' and 8" are of the cyclic type preliminary memory 8b described with reference to FIG. 4.

The first preliminary memory 8' inserts the various data individually into respective addresses in the sequential order with the progression of generation of the vibration waveform data detected by the vibration sensor 1.

When all of the addresses of the first preliminary memory 8' have been filled, the subsequent vibration waveform data are inserted individually into the respective addresses of the second preliminary memory 8" in accordance with the generation of such data.

A constant quantity of the vibration waveform data, detected by the vibration sensor 1 and subjected to the A/D conversion, are gradually stored in the cyclic type first preliminary memory 8'. When the CPU 5 recognizes the reference level terminating point ($P_3$) and the reference level starting point ($P_1$), it issues a command, by this serving as a trigger, such that selected data among data stored in the first preliminary memory 8' are taken out and transferred to the main memory 4 for storage therein.

During the transferring and storing operation, the second preliminary memory 8" gradually stores a constant quantity of vibration waveform data subsequent to the data stored in the first preliminary memory 8' in the cyclic manner. After the transfer from the first preliminary memory 8', the CPU 5 transfers the data selected from the data stored in the second preliminary memory 8" to the main memory so that the selected data are stored after the preceding data is stored in the main memory.

During the transferring operation from the second preliminary memory 8", the first preliminary memory 8' gradually stores a constant quantity of data subsequent to the data stored in the second preliminary memory 8" in the cyclic manner. The same procedures as mentioned above are then repeatedly performed.

Through the above-mentioned procedures, each unit datum of the $P_0$–$P_1$–$P_2$–$P_3$–$P_4$ can be sequentially gathered in a non-stop manner from the vibration waveform data detected by the vibration sensor 1.

Referring again to the previous description, the second embodiment includes the embodiment in which detection of the point $P_1$ serves as a trigger. Presuming that data of the point $P_1$ after the point $P_0$ have reached the first preliminary memory 8', the CPU 5 issues a command to the effect that data up to the point $P_0$ before the point $P_1$ should be transferred to and stored in the main memory 4. The CPU 5 also issues a command to the effect that data after the point $P_0$ before the point $P_1$ should be transferred to and stored in the main memory 4 and instructs the transfer and storage of the data up to the point $P_3$ after the point $P_1$ and the data up to the point $P_4$ which are sequentially stored in the first preliminary memory 8'.

The same procedures are also repeated in the second preliminary memory 8". In case the data from the point $P_0$ to the point $P_4$ are astride the first preliminary memory 8' and the second preliminary memory 8", the former is transferred first and then the latter is transferred so that the respective unit data from the point $P_0$ to the point $P_4$ are gradually stored and gathered in the main memory 4 in a non-stop manner as a whole.

The second embodiment includes the embodiment in which detection of the point $P_3$ serves as a trigger. Presuming that data of the point $P_3$ after the passage of the points $P_0$, $P_1$ and $P_2$ have reached the first preliminary memory 8', the CPU 5 issues a command to the effect that the data after the point $P_0$ before the point $P_3$ should be transferred to and stored in the main memory 4. The CPU 5 also instructs the transfer and storage of the data up to the point $P_4$ after the point $P_3$ which are subsequently stored in the first preliminary memory 8'.

The same procedures as mentioned above are repeated also in the second preliminary memory 8". In case the data from the point $P_0$ to the point $P_4$ are astride the first and second preliminary memories 8' and 8", the former is transmitted first and then the latter is transmitted so that respective unit data from the point $P_0$ to the point $P_4$ can gradually be stored and gathered in the main memory 4 in a non-stop manner as a whole.

Third Embodiment (FIGS. 3 and 16):

This embodiment includes, in a method for storing vibration waveform data sequentially detected by a vibration sensor 1, a shock vibration data storing method, in which a constant quantity of vibration waveform data are gradually stored in a progressive type preliminary memory with the progress of generation of the vibration waveform data, and selected data among the vibration waveform data stored in the preliminary memory are progressively transferred to a main memory for storage therein. In this embodiment, the progressive type preliminary memory 8a described with reference to FIG. 1, is used as a component part for constituting the shock vibration storing device.

As mentioned above, the vibration waveform data sequentially output from the vibration sensor 1 are progressively transferred to the respective addresses for storage by the progressive type preliminary memory 8a. When the data of the point $P_1$ or $P_3$ have reached the edge of the inlet port of the preliminary memory 8a, by the detection of the points $P_1$ or $P_3$ serving as a trigger, the data from the point $P_0$ to the point $P_4$ are progressively (one by one) transferred from the edge of the outlet port in accordance with the command from the CPU 5, so that the data are transferred to and stored in the main memory 4. This third embodiment can gather a large volume of unit data, including the peak point, with a single preliminary memory and in a non-stop manner, while taking advantage of the features of the progressive type preliminary memory.

According to the present invention, as understood from the first through third embodiments, when the vibration waveform data at the points $P_1$–$P_2$ –$P_3$ exceeding the reference level which is considered as being hazardous, are analyzed, both the future data $P_3$–$P_4$ and the past data $P_0$–$P_1$ are taken in so that they can be analyzed as a whole up to $P_0$–$p_4$. By doing this, the the data, including the peak point, can correctly be analyzed and the analyzed result can be used for improving the transportation conditions.

In the case where detection of the reference level terminating point ($P_3$), after the peak point $P_2$ serves as a trigger for a storing operation, the future data of the point $P_4$ after the point $P_1$ and the point $P_3$ can correctly be understood. Furthermore, the past data after the point $P_0$ before the points $P_1$ and $P_0$ can assuredly be obtained.

Also, as understood from the second and third embodiments, a large number of unit data, selected from the vibration waveform data sequentially detected by the vibration sensor, can be stored in a non-stop manner. Thus, the device obtainable according to the teaching of the present invention is best suited for use as a shock vibration data storing device over a long distance transportation.

We claim:

1. A method of storing vibration waveform data sequentially detected by a vibration sensor, said method comprising:

establishing a reference level;

detecting vibration waveform data from a first predetermined point ($P_0$) prior to a starting point ($P_1$) at said established reference level to a second predetermined point ($P_4$);

detecting a reference level terminal point ($P_3$) at said established reference level following a waveform having a peak point ($P_2$) and starting at said starting point ($P_1$)

detecting vibration waveform data after said reference level terminal point ($P_3$) to said second predetermined point ($P_4$);

storing said detected vibration waveform data in a first preliminary memory with said reference level terminal point ($P_3$) serving as a trigger for storing the data detected from said first predetermined point ($P_0$) to said second predetermined point ($P_4$); and transferring selected data from said detected vibration waveform data, stored in said first preliminary memory, to a main memory and storing said selected data in said main memory.

2. The method as claimed in claim 1, further comprising gradually storing a constant quantity of waveform data, subsequent to said selected data stored in said first preliminary memory, in a second preliminary memory during the time in which said selected data are transferred to said main memory.

3. The method of storing vibration waveform data sequentially detected by a vibration sensor as claimed in claim 1, further comprising sampling vibration waveform data at equal intervals by means of a clock and a counter.

4. The method of storing vibration waveform data sequentially detected by a vibration sensor as claimed in claim 1, wherein when the waveform reaches the reference level terminal point ($P_3$), a CPU issues a command so that said data after said reference level terminal point ($P_3$) to said second predetermined point ($P_4$) is stored in said first preliminary memory with the reference level terminal point $P_3$ serving as the trigger, and the selected data ($P_0$ to $P_4$), stored in said first preliminary memory, is transferred to said main memory by said CPU.

5. The method of storing vibration waveform data sequentially detected by a vibration sensor as claimed in claim 4, further comprising removing the selected data ($P_0$ to $P_4$) stored in said main memory for analysis thereof.

6. A method of storing vibration waveform data sequentially detected by a vibration sensor, said method comprising:

establishing a reference level;

detecting vibration waveform data from a first predetermined point ($P_0$), prior to a starting point ($P_1$) at said established reference level, to a second predetermined point ($P_4$);

detecting a reference level terminal point ($P_3$), which serves as a trigger for memorizing vibrational waveform data from said first predetermined point ($P_0$) to said second predetermined point ($P_4$), wherein said reference level terminal point ($P_3$) is at said established reference level following a waveform having a peak point ($P_2$) and starting at said starting point ($P_1$), and wherein said second predetermined point ($P_4$) is after said reference level terminal point ($P_3$);

storing a constant quantity of said detected vibration waveform data in a first progressive type preliminary memory; and progressively transferring selected data from said detected vibration waveform data, stored in said first progressive type preliminary memory, to a main memory and storing said selected data in said main memory.

7. The method of storing vibration waveform data sequentially detected by a vibration sensor as claimed in claim 6, wherein said step of storing a constant quantity of said detected vibration waveform data in a first progressive type preliminary memory includes inputting said detected vibration waveform data into a single inlet port of said first progressive type preliminary memory such that as data are input into said single inlet port, data previously input into the inlet port are progressively transferred into said first progressive type preliminary memory, and data at a single outlet port of said first progressive type preliminary memory are output from said first progressive type preliminary memory and stored in the main memory.

8. The method of storing vibration waveform data sequentially detected by a vibration sensor as claimed in claim 6, further comprising sampling vibration waveform data at equal intervals by means of a clock and a counter.

9. The method of storing vibration waveform data sequentially detected by a vibration sensor as claimed in claim 6, wherein when the waveform reaches the reference level terminal point ($P_3$), a CPU issues a command so that said data after said reference level terminal point ($P_3$) to said second predetermined point ($P_4$) is stored in said first preliminary memory with the reference level terminal point $P_3$ serving as the trigger, and the selected data ($P_0$ to $P_4$), stored in said first preliminary memory, is transferred to said main memory by said CPU.

10. The method of storing vibration waveform data sequentially detected by a vibration sensor as claimed in claim 9, further comprising removing the selected data ($P_0$ to $P_4$) stored in said main memory for analysis thereof.

* * * * *